(12) United States Patent
Prestenback et al.

(10) Patent No.: US 9,077,858 B2
(45) Date of Patent: Jul. 7, 2015

(54) MEDIA PLAYBACK SYSTEM AND METHOD FOR MONITORING USAGE OF MEDIA CONTENTS

(75) Inventors: Kyle Prestenback, Burbank, CA (US);
Jeff Ashbrook, North Hollywood, CA (US); Evan Tahler, Pittsburgh, PA (US);
David Jessen, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 564 days.

(21) Appl. No.: 12/653,827

(22) Filed: Dec. 18, 2009

(65) Prior Publication Data

US 2011/0150430 A1  Jun. 23, 2011

(51) Int. Cl.
| | |
|---|---|
| *H04N 9/80* | (2006.01) |
| *H04N 7/173* | (2011.01) |
| *G11B 27/10* | (2006.01) |
| *H04N 21/442* | (2011.01) |
| *H04N 21/658* | (2011.01) |
| *H04N 5/85* | (2006.01) |
| *H04N 21/426* | (2011.01) |

(52) U.S. Cl.
CPC .............. *H04N 7/173* (2013.01); *G11B 27/105* (2013.01); *H04N 5/85* (2013.01); *H04N 21/42646* (2013.01); *H04N 21/44222* (2013.01); *H04N 21/6582* (2013.01)

(58) Field of Classification Search
CPC ........... G11B 27/105; H04N 21/42646; H04N 21/44222; H04N 21/6582; H04N 5/85; H04N 7/173
See application file for complete search history.

(56) References Cited

U.S. PATENT DOCUMENTS

| | | | |
|---|---|---|---|
| 6,553,180 B1 * | 4/2003 | Kikuchi et al. | 386/241 |
| 7,047,302 B1 * | 5/2006 | Chatani et al. | 709/229 |
| 7,779,097 B2 * | 8/2010 | Lamkin et al. | 709/223 |
| 7,904,079 B1 * | 3/2011 | Lundy et al. | 455/423 |
| 8,005,724 B2 * | 8/2011 | Dunning et al. | 705/26.7 |
| 2004/0143661 A1 * | 7/2004 | Higashi et al. | 709/224 |

* cited by examiner

*Primary Examiner* — Tat Chio
(74) *Attorney, Agent, or Firm* — Farjami & Farjami LLP

(57) ABSTRACT

There is provided a media playback system for monitoring usage of a plurality of media contents. The system includes a memory configured to store an analytic log file corresponding to each of the plurality of media contents. The system also includes a processor. The processor is configured to identify the analytic log file corresponding to one of the plurality of media contents. The processor is further configured to collect data relating to a plurality of events. At least one of the plurality of events relates to the usage of one of the plurality of media contents. The processor is further configured to store at least one of the plurality of events in the analytic log file. In addition, the processor is configured to send the analytic log file to a remote network server if the network connection has been detected.

18 Claims, 2 Drawing Sheets

MEDIA PLAYBACK SYSTEM AND METHOD FOR MONITORING USAGE OF MEDIA CONTENTS

BACKGROUND OF THE INVENTION

1. Field of the Invention

The present invention relates to media content. More specifically, the present invention relates to media content interaction by end users and consumers.

2. Background Art

Optical media players, including Blu-ray players, provide a rich array of media content to homes and businesses. Optical media players, including Blu-ray players, are able to deliver high quality audio and video media content, especially when compared to predecessor technologies, including compact discs (CDs) and digital video discs (DVDs).

Optical media players, including Blu-ray players, also bring unprecedented levels of interactivity to end-users. Interactivity layers in the file and application systems of optical media players, including Blu-ray players, allow end-users to actively navigate a sea of menus, graphics, and special features that may accompany a media title or media series. Similarly, users of optical media players, including Blu-ray players, with Internet access can journey through interactive video games, chat capabilities, and social networking tools, all in the physical space of a small device that can be integrated into a home entertainment system.

However, due to technological and other limitations, media developers and media producers cannot evaluate or analyze the needs of users of optical media players, including Blu-ray players. Existing analytical tools, including web analytical tools, do not adequately tell media developers and media producers either what viewers are watching or how viewers are interacting with their content. Media developers and media producers therefore lack a systematic schema to evaluate the actions of users of optical media players, including Blu-ray players. These problems persist where network connectivity to a given optical media player, including a Blu-ray player, is sparse or intermittent.

Accordingly, there is a need to overcome the drawbacks and deficiencies in the art by providing a solution that enables media developers and media producers to chronicle the journey of a user of an optical media player, including a Blu-ray players, through the media provided.

SUMMARY OF THE INVENTION

There are provided media playback systems and methods for monitoring usage of media contents, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
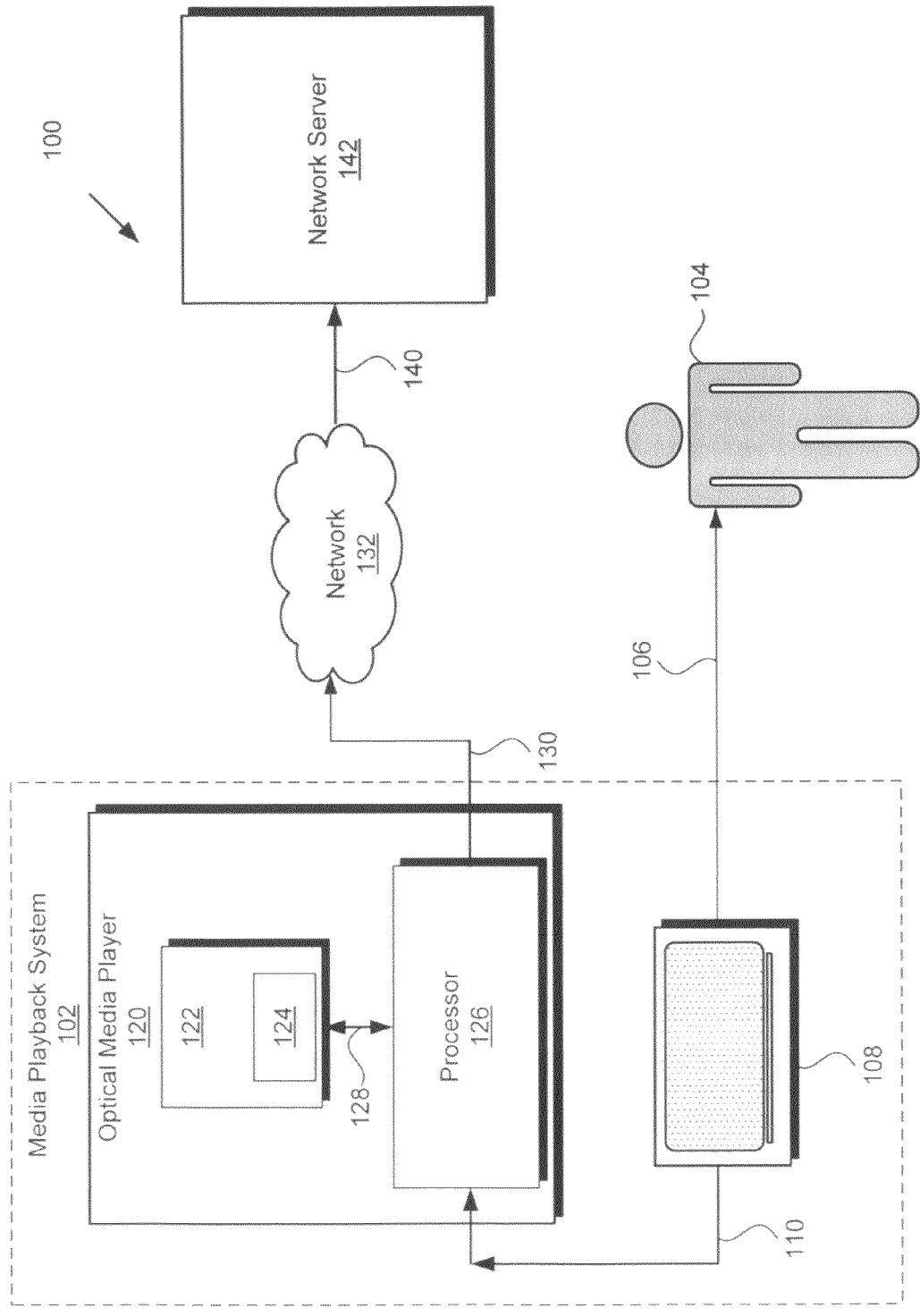
FIG. 1 shows a high-level block diagram of a system for monitoring usage of media contents, according to one embodiment of the present invention.

The present application is directed to a system and method for monitoring the usage of media contents in a media player. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Embodiments of the present invention allow media producers and media developers to chronicle the journey of a user through these high-quality and interactive media contents. FIG. 1 shows a high-level block diagram of how an embodiment of the present invention may implemented within network environment 100. As shown in FIG. 1, media playback system 102 may sit between end-user 104 and network 132. Media playback system 102 may be configured to include display 108. Media playback system 102 may also be configured to be connected to display 108 through cables or other communication means. As illustrated, display 108 may provide visual and audio signals 106 to end-user 104.

Media playback system 102 may also include optical media player 120, a unit that controls the operation of media playback system 102. As illustrated in FIG. 1, optical media player 120 may include processor 126 and memory 122. Optical media player 120 may be characterized by, for instance, the use of rapid and efficient modulation methods, robust error correction circuitry, the use of reliable wobbling address methods, and high speed recording phases.

In an embodiment of the present invention, optical media player 120 may include a file system and application environment. For example, optical media player 120 may incorporate Universal Disc Format (UDF), a file system that can provide the dual functionality of high-speed response to user input and high robustness and reliability necessary for the media content needs of a user, for example, end user 104. Other aspects of the UDF file system are addressed in *Universal Disk Format Specification*, Revision 2.60 (Optical Storage Technology Association, Mar. 1, 2005), hereby incorporated by reference as if set forth fully herein.

As illustrated in FIG. 1, the application environment of optical media player 120 may facilitate the delivery of interactive media contents from media producers and media developers to end users, for example end user 104. For instance, media producers and developers may produce interactive contents using the Blu-ray Disc Java (BD-J) specification, which is used to support the Java Micro Edition (Java ME) platform on a media playback device, for instance optical media player 120. Media producers and developers may program advanced interactive content in the form of Xlets, small applications that perform a specific task within the context of the BD-J specification.

The application environment of optical media player 120 may provide an interactivity layer, defined as a set of application programming interfaces (APIs) or object classes that wrap or extend network and other media resources peculiar to interactive media contents. With the BD-J specification, media producers and developers may run multiple threads of execution (threads). Thus, multiple tasks may be run simultaneously. Other aspects of the BD-J specification, including interactivity and threading features, are addressed in *White Paper, Blu-ray Disc Format, Parts* 1-3 (Blu-ray Disc Founders, August 2004), hereby incorporated by reference as if set forth fully herein.

Embodiments of the present invention may be embedded inside media playback system 102 or, alternatively, may reside externally from media playback system 102. In the case that an embodiment of the present invention resides outside media playback system 102, the claimed system and method could reside in an external unit (not pictured) that is outside media playback system 102. In such an external embodiment, the external unit could possess a media playback system processor and a media playback system memory distinct from the respective processor and memory of optical media player 120.

Further, in such an external embodiment, the file and application systems of the external unit could be adapted to conform to the file and application systems of optical media player 120. For example, the external unit could have file and application systems consistent with the BD-J specification if the BD-J specification is implemented in the application system of optical media player 120. If media playback system 102 is a Blu-ray player, an external embodiment may require the hardware and software of the external unit to be compatible. The external unit could further include other elements, including data buses (not pictured), address buses (not pictured), and input and output devices (not pictured).

Alternatively, embodiments of the present invention may be embedded inside media playback system 102. In such an internal embodiment, the system and method detailed in the present application can be executed by processor 126. Files and data structures necessary to embodiments of the present invention may be stored in memory 122.

In an embodiment of the present invention as further illustrated in FIG. 1, internal input signal 110, which may reside on an internal bus or conductor, may connect display 108 to optical media player 120 within media playback system 102. Processor 126 may execute instructions related to data contained in internal input signal 110. Processor 126 may also create data structures and files, for instance analytic log file 124, inside memory 122. As noted above, media playback system 102 may be configured to output client signal 130 to network 132. Network server 142 may incorporate analytic tools, including web analytic tools, with which media producers and developers can analyze data contained in analytic log file 124.

Figure 2:
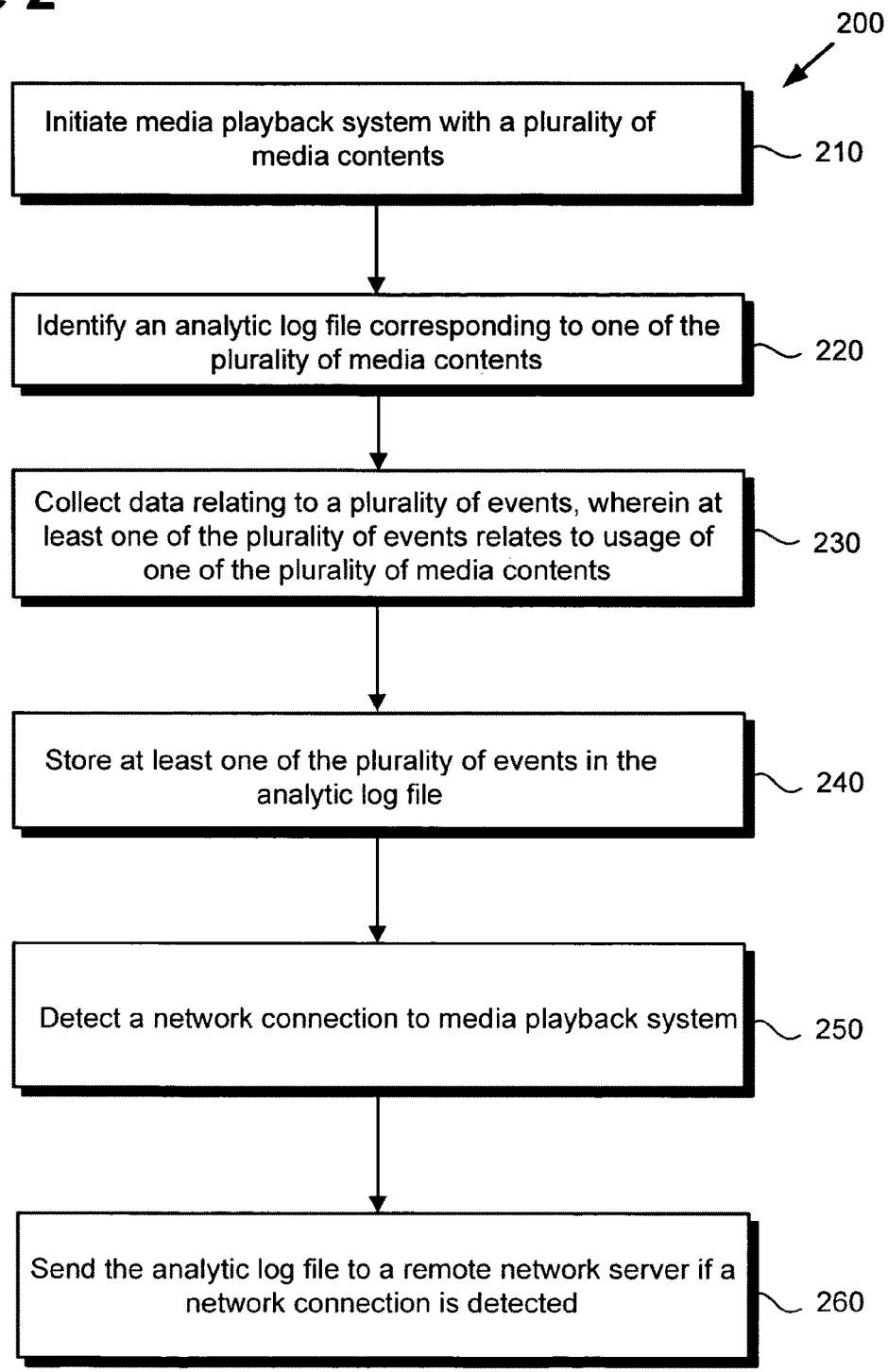
FIG. 2 presents a flowchart of a method for monitoring usage of media contents, according to one embodiment of the present invention

The functionality and advantages attributable to optical media system 100 will now be described further in conjunction with FIG. 2. FIG. 2 presents flowchart 200, which describes a method for monitoring the usage of media contents in an optical media player, such as a Blu-ray player, according to one embodiment of the present invention. The steps shown in flowchart 200 are merely exemplary, however, so that a step may comprise one or more substeps or may include specialized techniques, as is known in the art. While steps 210 to 260 indicated in flowchart 200 are sufficient to describe one embodiment of the present invention, other embodiments may utilize steps different from those shown in flowchart 200, or may include more, or fewer steps.

Turning to step 210 of flowchart 200, step 210 comprises initiating the media playback system with a plurality of media titles or series of media titles. In an embodiment illustrated in FIG. 1, processor 126 may run instructions consistent with the file system and application environment of optical media player 120.

For instance, optical media player 120 may be configured to run standard disc initiation routines within the BD-J specification to initiate optical media player 120 with a plurality of media titles or series of media titles. The plurality of media titles or series of media titles could include, for example, video content, audio content, interactive video games, or other content. The plurality of media titles or series of media titles may correspond to predetermined media title or a predetermined media series from a media producer or developer.

Turning to step 220 of flowchart 200, step 220 comprises identifying an analytic log file corresponding to one of the plurality of media titles or series of media titles. In an embodiment of the present invention illustrated in FIG. 1, optical media player 120 may be configured to run a Blu-ray analytic boot loader sequence within the general boot disc loader sequence. In one embodiment, both the Blu-ray analytic boot loader sequence and the general boot disc loader sequence may run after disc initiation routines have completed. Consistent with the general boot disc loader sequence routines, the Blu-ray analytic boot loader sequence may be performed before the first application is loaded in optical media player 120.

For example, the Blu-ray analytic boot loader sequence may start with a search for whether the file and application systems of optical media player 120 comply with Blu-ray profile 2.0. If Blu-ray profile 2.0 is found on the file and application systems, the Blu-ray analytic boot loader sequence may evaluate whether there exists a virtual file system exists that is associated with a preexisting analytic log file, for example, analytic log file 124 in FIG. 1. In an embodiment of the present invention, the virtual file system may correspond to media titles or series of media titles within a predetermined title or series, or media titles or series of media titles produced by a specific media studio.

If a virtual file system is found on the file and application systems, the Blu-ray analytic boot loader sequence may allow for the writing of session identification data to the analytic log file, for example analytic log file 124. If the Blu-ray analytic boot loader sequence finds no virtual file system corresponding to an analytic log file, for example analytic log file 124, the Blu-ray analytic boot loader sequence may create a virtual file system and an analytic log file, for example analytic log file 124. The Blu-ray analytic boot loader sequence may also write session identification information to that analytic log file, for instance analytic log file 124.

After an analytic log file, for example analytic log file 124, has been identified, the Blu-ray analytic boot loader sequence could conclude with an attempt to contact a network source, for instance network server 142, and send the contents of the analytic log file, for example analytic log file 124, to that network source, for instance network server 142.

Turning to step 230 of flowchart 200, step 230 comprises collecting data relating to a plurality of events, wherein at least one of the plurality of events relates to the usage of one of the plurality of media titles or series of media titles. In one embodiment illustrated in FIG. 1, optical media player 120 may be configured to collect data relating to one or more events corresponding to use or interactivity features relating to media titles or series of media titles that are ultimately played by media playback system 102.

The plurality of events could include a list of predetermined Blu-ray events relating to menu parameters, including events relating to general play features, menu languages, subtitles, and audio languages. The plurality of events could also include Blu-ray events like application initiation parameters, common feature type parameters, navigation parameters, trailer features, resume features, time line parameters, season play features, and BD-Live event parameters.

In one embodiment of the present invention, data relating to the plurality of events can be collected in an analytical start function compatible with the file and application system of optical media player 120. The analytical start function may implement a step to deposit data relating to the plurality of events into data structures compatible with the file and application systems of optical media player 120. For example, the plurality of events could be collected in a data string or data array compatible with the BD-J application environment. Collected data could relate to: a disc identifier, a disc session identifier, a timestamp, a time proof parameter, and a Blu-ray event parameter. Collected data could also correspond to a hexadecimal representation of data of a disc identifier, a disc session identifier, a timestamp, a time proof parameter, and a Blu-ray event parameter.

An embodiment of the present invention may collect a timestamp. The timestamp may be taken from an application's running time or the time present on a network server, for example network server 142. In accordance with embodiments of the present invention, a timestamp also may only be calculated if a network connection is detected.

In one embodiment of the present invention, the analytical start function may be executed in an analytic thread. The analytic thread may be distinct from the main application thread that executes applications within the application system of optical media player 120.

Turning to step 240 of flowchart 200, step 240 comprises storing at least one of the plurality of events in the analytic log file. As shown in FIG. 1, optical media player 120 can be configured to write collected event data into analytic log file 124, residing in memory 122. In an embodiment of the present invention, analytic log file 124 could be adapted for use with web tracking technology. For instance, analytic log file 124 could contain values that appear to indicate the number and duration of website visits, the number of page views, or other values consistent with web tracking technology. Analytic log file 124 could contain hexadecimal values corresponding to the plurality of media titles or series of media titles collected under step 230 of flowchart 200.

In one embodiment of the present invention, data could be written using a data writing function compatible with the file and application systems of optical media player 120. Such an exemplary data writing function may convert previously collected event data to hexadecimal values. During conversion, the data writing function could use the real-time timestamp. (As detailed above in the context of step 230 of flowchart 200, such a timestamp could be collected by offsetting an application's running time from the server time.) An embodiment of the data writing function could also include a routine to determine whether the analytic log file is full. If the analytic log file is full, an exemplary routine could include a method to clear the oldest data from the analytic log file before attempting a write operation. The data writing function could conclude by appending the hexadecimal representation of the collected event data into a memory object adaptable to be sent over network 132.

In one embodiment of the present invention, the data writing function may be executed in an analytic thread. Such an analytic thread may be distinct from the main application thread that executes applications within the application system of optical media player 120.

Turning to step 250 of flowchart 200, step 250 comprises detecting a network connection to the media playback system. In FIG. 1, optical media player 120 could be configured to detect whether client signal 130 to network 132 indicates a connection to network 132. The detection could occur within a function compatible with the file and application systems of optical media player 120. The detection could include, for example, a "ping" or other mechanism to test whether a host is reachable across an Internet protocol network. In an embodiment, the detection may repeat and may occur at predetermined time intervals. The detection may be executed in an analytic thread that is distinct from the main application thread of optical media player 120.

Turning to step 260 of flowchart 200, step 260 comprises sending the analytic log file to a remote network server if a network connection is detected. FIG. 1 illustrates, consistent with an embodiment of the invention, that the contents of analytic log file 124 may be sent through client signal 130 to network server 142, via network 132. In one embodiment of the present invention, data may be sent using a data sending function compatible with the file and application systems of optical media player 120. The data sending function may include a routine that attempts to send memory objects within analytic log file 124. The data sending function may send the memory object and clear analytic log file 124 so future write operations can be performed.

Alternatively, if the data sending function cannot send the memory object due to Internet connectivity problems or other problems, the data sending function may append the memory object to analytic log file 124 and return a value indicating that the memory object was not sent. In one embodiment, the data sending function may be executed in an analytic thread distinct from the main application thread of optical media player 120.

Consistent with network environment 100 in FIG. 1 and flowchart 200 in FIG. 2, the present invention may be used to monitor the usage of media titles or series of media titles. The present invention may also be used to monitor usage of media contents more generally. For example, steps corresponding to collecting, storing and sending a set of events corresponding to media titles or series of media titles may be adapted to collect, store and send media contents more generally. Accordingly, as detailed in the context of FIGS. 1 and 2, media contents, including video, audio, interactive, and other media contents may be monitored by embodiments of the present invention.

Thus, the present application discloses a system and method for monitoring the usage of media contents. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A disc playback system for monitoring usage of a plurality of media contents, the disc playback system comprising:

a memory configured to store a plurality of analytic log files, wherein each of the plurality of analytic log files corresponds to one of the plurality of media contents; and a processor configured to:
initiate playback, from a disc, a media content from the plurality of media contents, the disc having a disc identifier;
identify an analytic log file from the plurality of analytic log files corresponding to the media content;
collect data relating to a plurality of events, wherein at least one event from the plurality of events relates to a usage of the media content by a user of the disc playback system;
store, in the memory, the at least one event relating to the usage of the media content in the analytic log file that corresponds to the media content;
detect a network connection to the disc playback system; and
send the analytic log file, including the disc identifier and the at least one event relating to the usage of the media content by the user of the disc playback system, to a remote network server if the network connection is detected.

2. The disc playback system of claim 1, wherein the processor is further configured to:
detect whether the analytic log file is full; and
clear the oldest data from the analytic log file if the analytic log file is full.

3. The disc playback system of claim 1, wherein the disc is a Blu-ray disc and wherein the at least one event comprises Blu-ray events including trailer features stored in the analytic log file.

4. The disc playback system of claim 1, wherein data relating to the at least one event is stored in the memory using a data writing function compatible with a file system of the disc playback system.

5. The disc playback system of claim 1, wherein the disc is a Blu-ray disc, and wherein the disc is a Blu-ray disc, and wherein the at least one event comprises Blu-ray events including subtitles and audio languages stored in the analytic log file.

6. The disc playback system of claim 1, wherein the analytic log file comprises the duration of one of the plurality of media contents.

7. The disc playback system of claim 1, wherein the disc is a Blu-ray disc, and wherein the at least one event comprises Blu-ray events including time line parameters stored in the analytic log file.

8. A method for execution by a processor of a disc playback system for monitoring usage of a plurality of media contents, the disc playback system having a memory configured to store a plurality of analytic log files, wherein each of the plurality of analytic log files corresponds to one of the plurality of media contents, the method comprising:
initiating playback, from a disc, a media content from the plurality of media contents, the disc having a disc identifier;
identifying an analytic log file from the plurality of analytic log files corresponding to the media content;
collecting data relating to a plurality of events, wherein at least one event from the plurality of events relates to a usage of the media content by a user of the disc playback system;
storing, in the memory, the at least one event relating to the usage of the media content in the analytic log file that corresponds to the media content; and
detecting a network connection to the disc playback system; and
sending the analytic log file, including the disc identifier and the at least one event relating to the usage of the media content by the user of the disc playback system, to a remote network server if the network connection is detected.

9. The method of claim 8, further comprising:
detecting whether the analytic log file is full; and
clearing the oldest data from the analytic log file if the analytic log file is full.

10. The method of claim 8, wherein the disc is a Blu-ray disc, and wherein the at least one event comprises Blu-ray events including trailer features stored in the analytic log file.

11. The method of claim 8, wherein data relating to the at least one event is stored in the memory using a data writing function compatible with a file system of the disc playback system.

12. The method of claim 8, wherein the disc is a Blu-ray disc, and wherein the disc is a Blu-ray disc, and wherein the at least one event comprises Blu-ray events including subtitles and audio languages stored in the analytic log file.

13. The method of claim 8, wherein the analytic log file comprises the duration of one of the plurality of media contents.

14. The method of claim 8, wherein the disc is a Blu-ray disc, and wherein the at least one event comprises Blu-ray events including time line parameters stored in the analytic log file.

15. A disc playback system for monitoring usage of a plurality of media contents, the disc playback system comprising:
a memory configured to store a plurality of analytic log files, wherein each of the plurality of analytic log files corresponds to one of the plurality of media contents;
a processor configured to:
initiate playback, from a disc, a media content from the plurality of media contents, the disc having a disc identifier;
run an analytic thread and an application thread;
wherein the analytic thread is further configured to:
identify an analytic log file from the plurality of analytic log files corresponding to the media content;
collect data relating to a plurality of events, wherein at least one event from the plurality of events relates to a usage of the media content by a user of the disc playback system;
store, in the memory, the at least one event relating to the usage of the media content in the analytic log file;
detect a network connection to the disc playback system; and
send the analytic log file, including the disc identifier and the at least one event relating to the usage of the media content by the user of the disc playback system, to a remote network server if the network connection is detected; and
wherein the least one event comprises Blu-ray events including trailer features stored in the analytic log file.

16. The disc playback system of claim 15, wherein the disc is a Blu-ray disc, and wherein the at least one event comprises Blu-ray events including trailer features stored in the analytic log file analytic log file.

17. The disc playback system of claim 16, wherein data relating to the at least one event is stored in the memory using a data writing function compatible with a file system of the disc playback system.

18. The disc playback system of claim 15, wherein the disc is a Blu-ray disc, and wherein the disc is a Blu-ray disc, and wherein the at least one event comprises Blu-ray events including subtitles and audio languages stored in the analytic log file.

* * * * *

UNITED STATES PATENT AND TRADEMARK OFFICE
CERTIFICATE OF CORRECTION

| | | |
|---|---|---|
| PATENT NO. | : 9,077,858 B2 | Page 1 of 1 |
| APPLICATION NO. | : 12/653827 | |
| DATED | : July 7, 2015 | |
| INVENTOR(S) | : Prestenback et al. | |

It is certified that error appears in the above-identified patent and that said Letters Patent is hereby corrected as shown below:

In the Claims,

Column 8, line 52, Claim 15, "file;" should be changed to --file that corresponds to the media content;--

Column 8, lines 66-67, Claim 16, "analytic log file analytic log file." should be changed to --analytic log file.--

Signed and Sealed this
Eighth Day of September, 2015

Michelle K. Lee
*Director of the United States Patent and Trademark Office*